United States Patent [19]

DeBraal et al.

[11] Patent Number: 4,877,265
[45] Date of Patent: Oct. 31, 1989

[54] ADJUSTABLE HEIGHT VEHICLE ROLL-OVER BAR

[75] Inventors: Stanley J. DeBraal, West Bend, Wis.; Daniel R. Nickles, Monroe, N.Y.

[73] Assignee: Deere & Company, Moline, Ill.

[21] Appl. No.: 226,253

[22] Filed: Jul. 29, 1988

[51] Int. Cl.$^4$ .............................................. B60R 21/13
[52] U.S. Cl. ....................................................... 280/756
[58] Field of Search ......................................... 280/756

[56] References Cited

FOREIGN PATENT DOCUMENTS

| | | | |
|---|---|---|---|
| 726593 | 1/1966 | Canada | 280/756 |
| 907098 | 8/1972 | Canada | 280/756 |
| 7710020 | 8/1978 | Netherlands | 280/756 |
| 479425 | 11/1969 | Switzerland | 280/756 |
| 1522906 | 8/1978 | United Kingdom | 280/756 |

OTHER PUBLICATIONS

Case IH Literature, Foldable Tractor ROPS (Models 1896/2096).
Case IH 1394 Operator's Manual, pp. 146-149.
Drawings, MF and Case IH (2 sheets).

*Primary Examiner*—Kenneth R. Rice

[57] ABSTRACT

An adjustable height roll-over bar is provided in which the cross-piece is separate from the vertical members. The height of the roll-over bar is adjusted by adjusting the connection between the cross piece and the roll-over bar. The three embodiments for this connection are taught: First, corner brackets are provided and an extension can be added between the vertical member and the corner bracket to increase the height of the roll-over bar. One corner bracket leg is longer than the other to compensate for the difference in horizontal distance between the vertical member and the vertical member plus extension when the vertical members are angled. The same corner brackets can be used at either height simply by flipping the corner bracket end-for-end to adjust the position of the long leg. In the second embodiment, the vertical members and the cross piece each are provided with angled engagement surfaces, preferably 45 degrees. These surfaces can be engaged in a complimentary fashion so that the vertical members align with the U-shaped cross piece and provide maximum height. Alternatively, the cross piece can be flipped end-for-end so that the cross piece extends at an angle from the vertical members, preferably rearwardly at about 90 degress. These surfaces are provided with matching knobs and depressions to prevent motion therealong and a bolt or other engagement means is provided to hold the two surfaces together. In the third embodiment, the cross piece is pivotally mounted to the vertical members. While the vertical members can be angled slightly relative to one another, the pivot surface on the two hinges is parallel. The U-shaped cross piece is pivotal between a maximum height position parallel to the vertical members and one extending rearwardly therefrom at a lower height. A quick release pin is provided to hold the cross piece in either of these positions.

23 Claims, 3 Drawing Sheets

FIG. 1
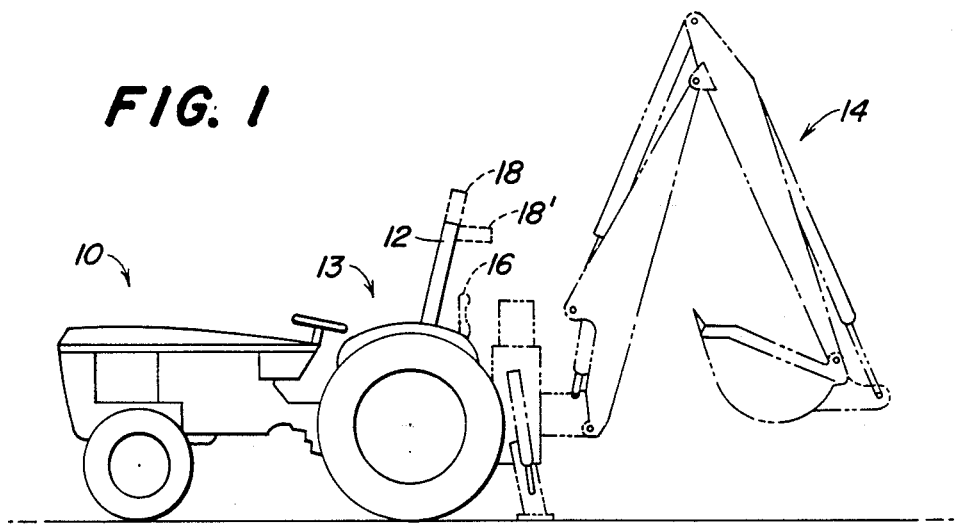
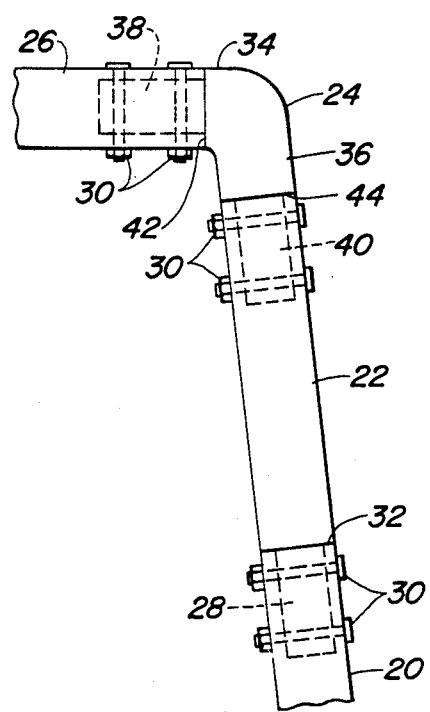
FIG. 2
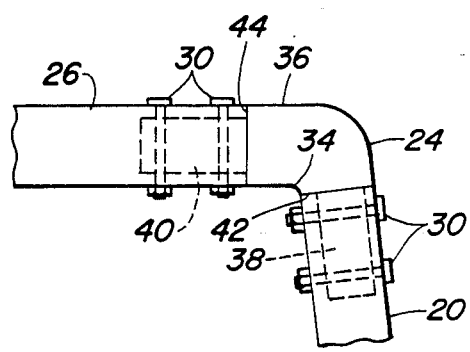
FIG. 3

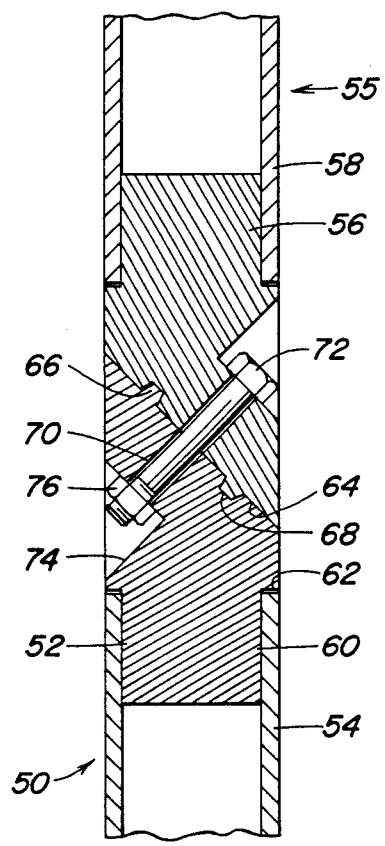
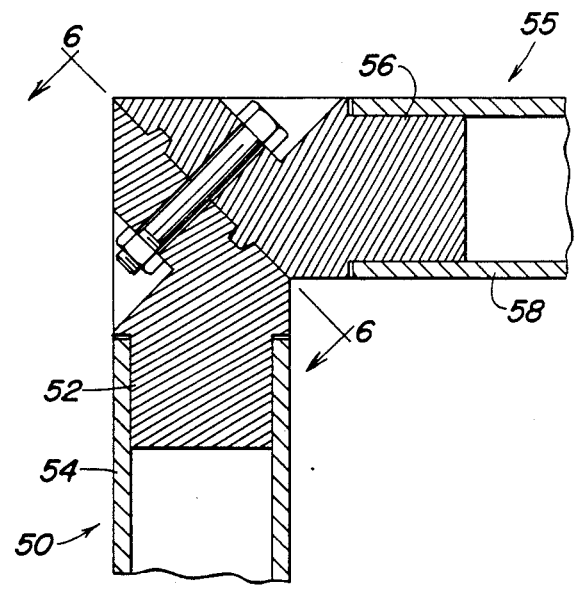
FIG. 4  FIG. 5
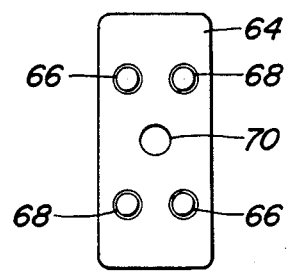
FIG. 6

ADJUSTABLE HEIGHT VEHICLE ROLL-OVER BAR

BACKGROUND OF THE INVENTION

1. Field of the Invention

The present invention relates to vehicle roll-over bars, and particularly adjustable height vehicle roll-over bars for use in connection with work vehicles such as agricultural tractors.

2. Description of the Related Art

With the exception of very small, relatively lightweight vehicles such as lawn and garden tractors, most vehicles are provided with some form of roll-over protection system, or ROPS, to prevent the vehicle from crushing the operator if it accidentally rolls over. The simplest such ROPS widely used on small agricultural tractors is a U-shaped bar. The ends of the U are attached to the frame of the tractor and the base of the U is positioned in the vicinity of the vehicle's operator station. The sides of the U may be perfectly vertical, but typically are sloped slightly back from the operator station to provide additional clearance around the operator station.

Different vehicle configurations may require different roll-over bars. The roll-over bar must, of course, be taller than even the tallest person likely to be operating the vehicle. At the same time, however, it is preferable to have the roll-over bar as short as possible within this limitation to maximize overhead clearance of the vehicle.

The addition of certain implements to the vehicle may have an impact on the preferred height of the ROPS. For example, a John Deere model 750 utility tractor, shown in FIG. 1 at 10, comes equipped with a U-shaped roll-over bar 12. This roll-over bar 12 has a height selected to provide adequate protection for the operator station 13 while at the same time being short enough to maximize the overhead clearance of the vehicle. However, such a tractor can be equipped with a backhoe, shown in phantom lines at 14. This backhoe is provided with a separate seat 16, shown in the drawing in its inactive position, which when moved down into its active position is positioned somewhat above the normal seat for the tractor 10. As a result, the normal roll-over bar 12 is too short to provide adequate space when the operator is seated in seat 16, and a taller roll-over bar 18 must be substituted therefor.

In the past, this substitution has been accomplished by simply maintaining two stocks of roll-over bars, the shorter version for use on most tractors and the taller version for use on the smaller number of tractors to be equipped with backhoes. The dealer making the ultimate sale normally will substitute the taller ROPS for the shorter ROPS when appropriate.

This technique has several disadvantages. First, the dealer must maintain a supply of both size ROPS. This ties up both capital and storage space. Second, the attachment points for the U-ends of the ROPS sometimes are not easily accessible, so that substituting a different ROPS can be time-consuming.

SUMMARY OF THE INVENTION

Accordingly, it is an object of the present invention to provide a roll-over bar which is easily adjustable between different heights. Preferably, the adjustment will be made at the top portion of the roll-over bar, which is easily accessible.

In a first embodiment of the present invention, the standard-height roll-over bar is split into pieces so that the cross bar is a separate component from the two substantially vertical members. In this fashion, a higher roll-over bar can be provided simply by adding an extension to the vertical members. If the vertical members are sloped inward, the cross bar preferably further is split into a cross-piece and two L-shaped corner pieces, with the corner pieces connecting the cross piece to the vertical members. At least one side of each L-shaped corner piece is angled slightly to match the angling of the vertical members. One side also extends somewhat further than the other side so that with the long ends of the corner pieces connecting to the cross piece, the spacing of the short ends matches the spacing of the vertical members. Similarly, when the short leg of each corner piece is connected to the cross piece, the other leg matches the spacing of the vertical members with the extensions added (which is somewhat narrower due to the angling of the vertical members).

In a second preferred embodiment, the top (base) and a small portion of each side of the U of the roll-over bar is split into a separate component from the remainder of the vertical members. Each side of the cross bar and vertical members end complementary angles, e.g., 45 degrees. The cross bar can be positioned with these 45 degree angles matching to align it with the vertical members, so that a substantially straigt roll-bar is provided. Alternatively, the cross bar can be flipped end for end and the edges rematched, in which case the two 45 degree angles combine to provide a 90 degree angle. The top part of the roll-over bar then extends horizontally from the vertical members, preferably rearwardly. Preferably, suitable matching knobs and depressions are provided in the 45 degree angled faces to prevent relative movement therebetween, with bolts provided to hold these knobs and depressions in engagement.

In a third embodiment according to the present invention, the top (base) and a small portion of each side of the U again are split from the remainder of the vertical members, with hinged pins connecting the cross bar to the vertical members. The cross bar then can pivot between a position parallel to the vertical members and a position horizontally extending therebehind. Suitable pins, bolts, or other means are provided to hold the cross bar in whichever position is selected.

The latter two embodiments have the advantage that nothing need be added to the standard high roll-over bar to increase its height, in contrast to the first embodiment which requires addition of an extension. The first embodiment has the advantage that the material that goes into providing the additional height is used only in connection with those roll-over bars which require the additional height. While these extensions must still be stored in the same fashion as the old higher roll-over bar, they are considerably smaller and less expensive.

BRIEF DESCRIPTION OF THE DRAWINGS

FIG. 1 depicts a tractor with a roll-over bar and a backhoe.

FIGS. 2 and 3, respectively, depict a tall and standard-height roll-over bar according to a first embodiment of the present invention.

FIGS. 4 and 5 depict a second embodiment of the invention in a tall and standard height configuration FIG. 6 depicts a plan view of an end face of the engaging surfaces of the roll-over bar of FIGS. 4 and 5.

DETAILED DESCRIPTION OF THE PREFERRED EMBODIMENTS

Figure 9:
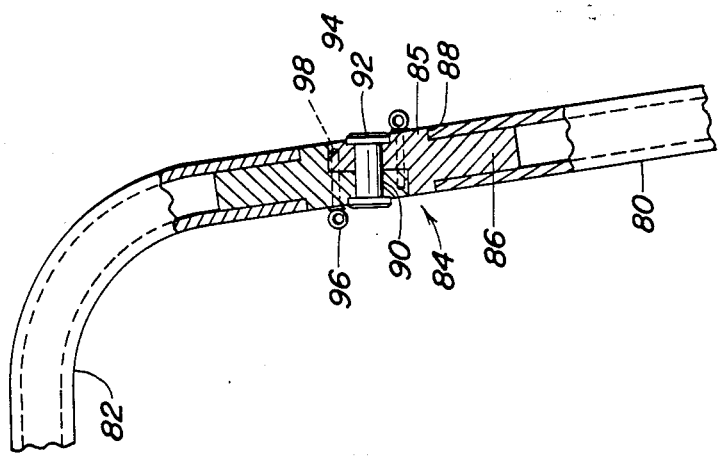
FIG. 9 depicts a cross-sectional view along 9—9 in FIG. 7.

FIG. 2 illustrates one corner of a first preferred embodiment of a roll-over bar according to the present invention in a tall configuration. It includes a substantially vertical member 20, an extension 22, a corner piece 24 and a cross piece 26. The vertical member 20 is not strictly vertical. It slopes inward slightly and can also slope backwardly relative to the tractor, as shown with roll-over bar 12 in FIG. 1. Vertical member 20 typically is entirely hollow, but at the very least has an opening for receiving a nose 28 of the extension 22. This nose 28 is attached to the vertical member 20, e.g., by bolts 30. Extension 22 has a shoulder 32 at the base of nose 28 which fits flushly against the upper end of vertical member 20, so that when extension 22 is bolted in place on vertical member 20, it is firmly held in a position where it essentially forms a continuation of vertical member 20.

The corner piece 24 is substantially L-shaped. Each leg 34, 36 of the corner piece 24 is provided with a nose 38, 40 which is substantially identical in shape to the nose 28 on the extension 22. Each leg 34, 36 of the corner piece 24 also is provided with a shoulder 42, 44 at the base of its nose 38, 40, 44.

The upper end of the extension 22 and each end of the cross piece 26 are provided with openings similar to that in the vertical member 20 to receive the noses 38, 40 of the corner piece 24. Again, the noses 38, 40 are held in the openings, e.g., by bolts 30. Also as with the extension 22, the shoulders 42, 44 fit flushly against the ends of the extension 22 and cross piece 26 so that the entire structure is held rigidly together once the bolts 30 are in place.

It will be noted that legs 34, 36 are not at right angles to one another. The angle is chosen to match the angle of the vertical member 20, so that the cross piece 26 is positioned substantially horizontally.

FIG. 3 depicts the first embodiment of the present invention in the standard-height configuration. In this configuration, the extension 22 is omitted. The corner piece 24 is flipped end for end, so that nose 40 of leg 36 connects to the cross piece 26, while nose 38 of leg 34 connects to the vertical member 20. As is easily noted in the drawings, leg 36 is somewhat longer than leg 34. The additional length compensates for the difference in the horizontal position of the end of vertical member 20 and the end of extension 22 when it is attached to vertical member 20, so that the same cross piece 26 can be used in either configuration. In the tall configuration, the extra length in leg 36 simply adds height to the roll-over bar. In the standard height configuration, the extra leg adds horizontal length to the cross piece 26.

As may be seen, with this construction, the only additional elements necessary to convert the standard-height roll-over bar to a tall roll-over bar is an extension 22 for each vertical member 20 and the bolts 30 to connect it. Thus, the roll-over bar can be shipped from the factory either with the extension 22 in place for subsequent removal when necessary, or, more preferably, the dealer can simply maintain a stock of extensions 22 and bolts 30, and add them when necessary. Note that all parts that need changing are readily accessible at the top of the roll-over bar.

FIGS. 4-6 depict a second preferred embodiment according to the present invention. In this embodiment, the vertical member 50 ends in a surface which is angled relative to the plane of the vertical member 50, with the topmost point of the vertical member at the height desired for a standard-height roll-over bar. The angle is shown in the drawing as 45 degrees, but can be any angle. While the end of the vertical member 50 can be formed into this shape in any fashion, it preferably is accomplished by providing a cast piece 52, which will be described in greater detail below, fixed to the top end of a tube 54, e.g., by welding.

The cross piece 55 of the roll-over bar is formed in a U-shape, with the U ends ending in an angle complementing that of the vertical members 50. Again, the angled surface could be formed by any means, but preferably it is formed by a cast piece 56 fixed to a U-shaped tube 58 forming the balance of the cross piece.

The castings 52, 56 preferably are substantially identical, and substantially identical castings are provided for each side of the roll-over bar. Referring to casting 52 as an example, the casting has a nose 60 which extends into the tube 54 to which it is attached. A shoulder 62 is provided at the base of the nose 60 and preferably rests flush against and is welded to the tube 54. The opposite side 64 of the casting 52 is formed at substantially a 45 degree angle. This surface 64 is provided with matching raised knobs 66 and depressions 68 for an engagement with the corresponding raised knobs 66 and depressions 68 in the adjacent casting 56 in a manner to be described below. The casting also is provided with a through bore 70 for receiving a bolt 72 to hold the casting 52 in contact with the adjacent casting 56. A notch 74 preferably is provided in the side surface of the casting 52 so that the head of the bolt 72 or the nut 76 attached to the bolt 72 can be positioned completely within the outer dimensions of the roll-over bar.

To position the roll-over bar in the tall configuration, the two castings 52, 56 are positioned so that their respective angles complement one another to provide a straight connection, as shown in FIG. 4. Bolt 72 and nut 76 serve to hold the surfaces 64 of the two castings flush together. In this position, knobs 66 of casting 52 engage depressions 68 of casting 56, and vice-versa, thereby preventing movement of the two castings 52, 56 along their respective surfaces 64.

To position the roll-over bar in the standard height configuration, the bolt 72 and nut 76 are removed from through bores 70 in the castings 52, 56, the cross piece 55 of the roll-over bar is flipped end for end and again positioned against the castings 52. The bolt 72 and nut 76 then are repositioned in the through bore 70 to hold the two castings 52, 56 together. In this configuration, the two angles add together, producing a 90 degree angle, so that the cross piece 55 extends substantially rearwardly relative to the vertical members 50, as shown at 18' in FIG. 1. Again, the intermeshing raised knobs 66 and depressions 68 prevent movement along the respective surfaces 64 of the castings 52, 56.

Figure 8:
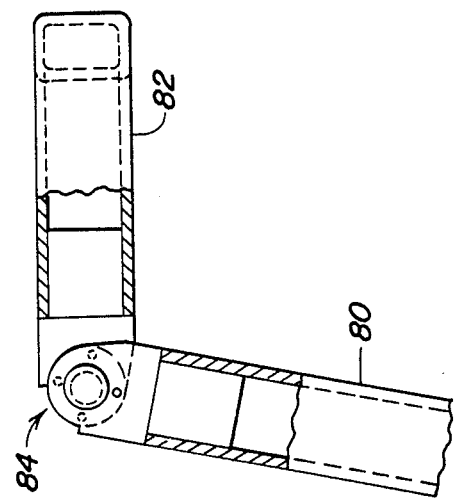
FIGS. 7 and 8, respectively, depict side views of a third embodiment of the invention in a tall and standard-height configuration.
Figure 7:
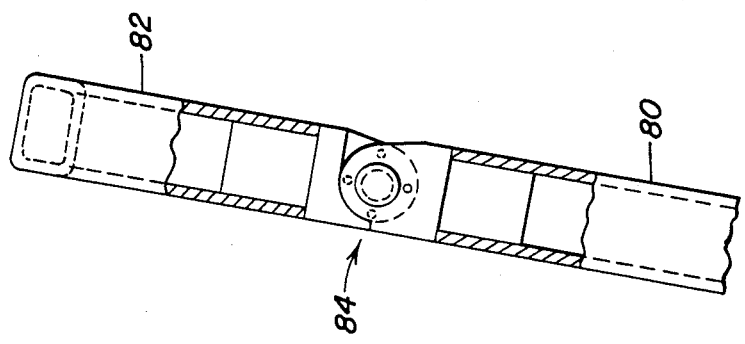

FIGS. 7-9 depict a third embodiment of a roll-over bar according to the present invention. Again, the vertical members 80 are separate from the substantially U-shaped cross piece 82. This time, however, the connection between them is made by a hinge 84.

The hinge 84 is conveniently constructed by providing two substantially identical castings. As best seen in FIG. 9, each casting 84 has a nose 86 for insertion into the vertical member 80 or U-shaped cross piece 82 and a shoulder 88 for fitting flush against the end of the tube into which the nose 86 fits. Again, the casting is welded or otherwise attached to the tube. Each casting is provided with a through bore 90 for holding a pivot pin 92. It also is provided with a pivot surface 94 which is substantially vertical, in contrast to the other external surfaces of the casting 85, which are substantially parallel to the outer surfaces of the vertical member 80 and the U-shaped cross piece 82. Quick release pins 96 are provided to engage notches 98 in the pivot surface 94 of the opposing casting 85 to hold the cross piece 82 in the desired position.

The two desired positions are illustrated in FIGS. 7 and 8. In FIG. 7, the hinge is positioned to align cross piece 82 with the vertical member 80, while in FIG. 8 the hinge is positioned to have the cross piece extended rearwardly from the vertical member 80.

Various modifications to the above preferred embodiments will be readily apparent to one of ordinary skill in the art. For example, while particular elements have been described as bolted together or welded together, any other suitable fastening means could be employed. Similarly, the second and third embodiments have been depicted as being held in their proper orientation by knobs or pins engaging corresponding depressions, but any other suitable alignment means could be employed. The second and third embodiments also have been shown with the cross-piece substantially perpendicular to the vertical members when in the standard height configuration, but it will be understood that any other angle can be obtained by selection of appropriately angled ends or hinge stops. Indeed, if the vertical members slope backwards as shown in FIG. 1, it would be preferable to select the angles required to make the cross-piece horizontal.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modification and variations which fall within the spirit and scope of the appended claims.

We claim:

1. An adjustable roll-over bar comprising:
   two substantially vertical members angled slightly towards one another;
   a substantially horizontal cross-piece;
   two extensions, each extension being selectively connectible to a corresponding one of said vertical members; and
   two corner pieces, each corner piece having two legs, with one of said legs being connectible to an end of said cross-piece and the other of said legs being connectible to one of said extensions if said extensions are connected to said vertical members and to an upper end of one of said vertical members if said extensions are not connected to said vertical members, one leg of each corner piece being longer than the other leg by an amount sufficient to compensate for the difference in horizontal distance between the tops of said vertical members and the tops of said extensions when positioned on the vertical members.

2. The adjustable roll-over bar of claim 1, wherein each leg of each corner piece and one end of each extension is provided with a nose, and the top of each vertical member, each end of the cross-piece and the other end of each extension is provided with a bore for receiving a corresponding one of said noses, each said nose and each said bore being substantially identical to each of the other noses and bores, respectively.

3. The adjustable roll-over bar of claim 2, wherein each leg of each corner piece and said one end of each extension is provided with a shoulder at the base of its nose for resting flush against the end of the coresponding vertical member, cross-piece and extension.

4. The adjustable roll-over bar of claim 3, wherein each nose and the walls of the receiving bore are provided with matching bores in which bolts can be inserted to hold each said nose in the corresponding receiving bore with the corresponding shoulder flush against the corresponding end.

5. The adjustable roll-over bar of claim 1 further comprising a tractor to which said roll-over bar is mounted.

6. An adjustable roll-over bar comprising:
   two substantially vertical members, the upper ends of which terminate in a plane angled relative to the plane of the ends of the vertical members;
   a cross-piece connecting the tops of said vertical members and having surfaces angled relative to the plane of the ends of the cross-piece; and
   means for selectively attaching said angled surfaces of said vertical members and said cross-piece so that said plane of the ends of the vertical members and said cross-piece are aligned or so that they are angled relative to one another.

7. The adjustable roll-over bar of claim 6, wherein said angled surfaces are angled at 45 degrees.

8. The adjustable roll-over bar of claim 6, wherein said angled surfaces are provided with corresponding engagement knobs and depressions for preventing movement of said angled surfaces within their common plane.

9. The adjustable roll-over bar of claim 6, wherein said ends are provided with matching bores for receiving a bolt for holding said angled surfaces in engagement.

10. The adjustable roll-over bar of claim 9, wherein said ends are provided with a notch at the end of said bores so that a bolt therein need not extend behind the general perimeter of the roll-over bore.

11. The adjustable roll-over bar of claim 6, wherein the main body of each vertical member and of the cross-piece is tubular.

12. The adjustable roll-over bar of claim 11, wherein said ends are cast pieces attached to said tubular main body.

13. The adjustable roll-over bar of claim 12, wherein each said cast piece comprises:
   a nose for fitting inside the corresponding main body;
   a shoulder at the base of the nose for fitting flush against an end surface of said main body;
   an angled surface opposite said nose;
   a plurality of similarly shaped knobs and depressions formed on said angles surface for engagement with the knobs and depressions on an adjacent casting; and
   a through bore for receiving a bolt to hold the casting to the adjacent castings.

14. The adjustable roll-over bar of claim 6. wherein the cross-piece is U-shaped.

15. The adjustable roll-over bar of claim 6, further comprising a tractor to which said roll-over bar is mounted.

16. An adjustable roll-over bar, comprising:
two substantially vertical members;
a cross-piece pivotally mounted to the upper ends of said vertical members and pivotal between a first position substantially aligned with said vertical members and a second position angled relative to said vertical members, said roll-over bar being operative with said cross-piece in either of said positions; and
means for selectively holding said cross-piece in either of said positions.

17. The adjustable roll-over bar of claim 16, wherein the main body of each said vertical member and said cross-piece is tubular.

18. The adjustable roll-over bar of claim 17, wherein a cast piece is attached to said upper end of each said vertical member main body and to each end of said cross-piece main body, said pivotal mounting being provided by said cast pieces.

19. The adjustable roll-over bar of claim 18, wherein each said cast piece comprises:
a nose for fitting inside of the corresponding main body;
a shoulder to the base of the nose for fitting flush against an end surface of the corresponding main body; and
a pivot bracket having a pivot hole formed therein for receiving a pivot pin and a planar pivot surface for engaging the planar pivot surface of the corresponding adjacent casting.

20. The adjustable roll-over bar of claim 19, wherein said vertical members are angled slightly towards one another and wherein the planar pivot surfaces of the castings on the vertical members are parallel.

21. The adjustable roll-over bar of claim 20, wherein each casting further is provided with at least one pin bore for receiving a pin and at least two corresponding notches for engagement by the pin of the corresponding adjacent casting.

22. The adjustable roll-over bar of claim 16 wherein said cross-piece is U-shaped.

23. The adjustable roll-over bar of claim 16, further comprising a tractor to which said roll-over bar is mounted.

* * * * *